E. D. Pugh. Bee Hive.

No. 118,972.  Patented Sep. 12, 1871.

Witnesses:
P. C. Dieterich.
Wm. H. E. Smith.

Inventor:
E. D. Pugh,
per Munn & Co.
Attorneys.

UNITED STATES PATENT OFFICE.

EDWARD D. PUGH, OF FORT PLAIN, IOWA.

IMPROVEMENT IN BEE-HIVES.

Specification forming part of Letters Patent No. 118,972, dated September 12, 1871.

*To all whom it may concern:*

Be it known that I, EDWARD D. PUGH, of Fort Plain, in the county of Warren and State of Iowa, have invented a new and Improved Bee-Hive; and I do hereby declare that the following is a full, clear, and exact description thereof, which will enable others skilled in the art to make and use the same, reference being had to the accompanying drawing forming part of this specification.

My invention consists in improving bee-hives, as hereinafter fully described and subsequently pointed out in the claim.

Figure 1:
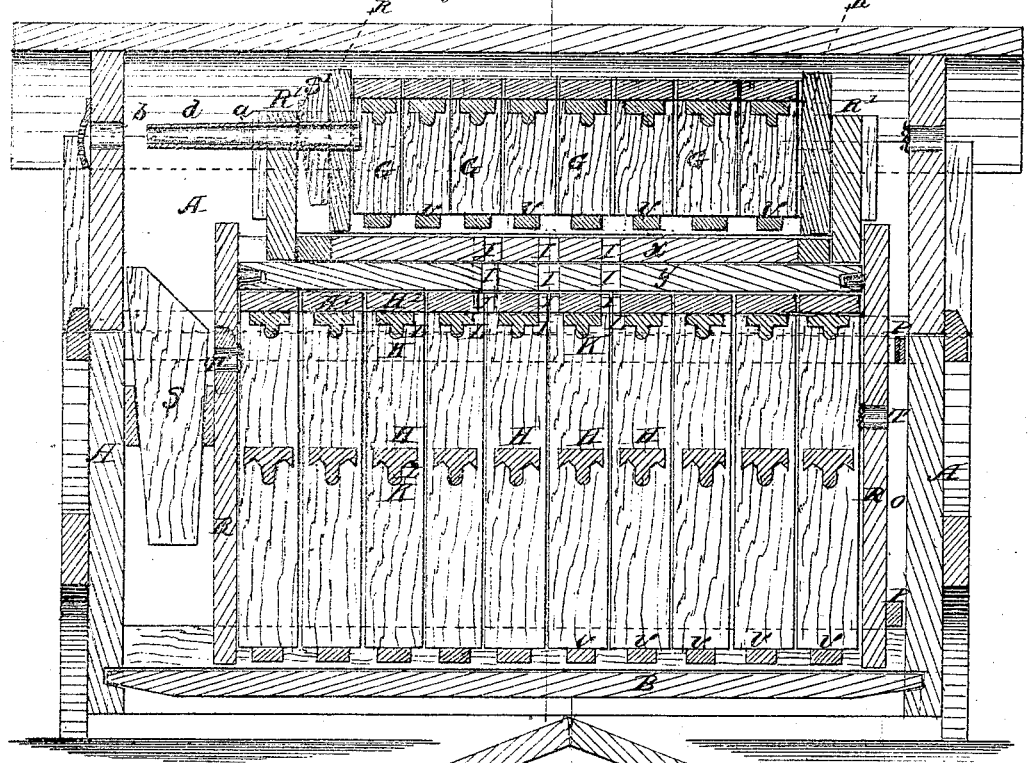
Figure 2:
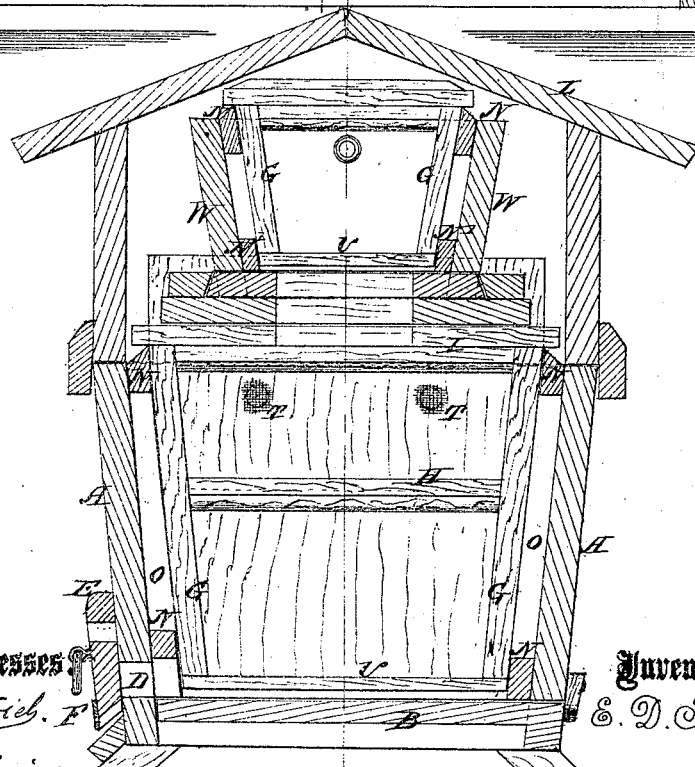

Figure 1 is a longitudinal sectional elevation of my improved bee-hive, and Fig. 2 is a transverse sectional elevation.

Similar letters of reference indicate corresponding parts.

The lower part A of the case, which is of rectangular form and in cross-section, is preferably made with sides gradually inclining outward toward the top, and has a bottom, B, capable of sliding outward at the rear side of the hive, or the one opposite to the passage D for the ingress and egress of the bees, the object of the arrangement being to admit of opening and closing it frequently, for cleaning it of the moth-eggs and other insects, without disturbing the bees as much as would be the case if it opened to the front side, where it would interfere with the passage D. The said passage D is made in the lower edge of a vertically-sliding gate, E, which may be raised from time to time to open a passage the whole length of the side of the hive for ventilation, or at times when the weather will admit. The said passage is covered, when it may be required to shut the bees in, by a perforated cover, F, which will prevent the passage of the bees but admit air for ventilation. Two or more of these passages may be used, as found best. Having observed that the bees naturally build their comb with cells gradually decreasing in size so as to contract the breadth of them as they extend downward, which, I suppose, is to regulate the weight suspended from the upper cells according to their sustaining capacity, I have conceived the idea of contracting the breadth of the sashes employed for them to deposit the combs upon, so that the side pieces G of said sashes will be adapted to have the edges of the combs lodged on them, by reason of this tendency of the bees to contract the combs, both for the better support of the combs and to induce the bees to build the combs between the said side pieces instead of building across them in the other direction, which sometimes happens, and which makes it very difficult to remove the combs. For the accommodation of young broods I introduce the cross pieces H between the side pieces, and fit them so as to rest by their beveled ends on the sides G without any other fastenings. They may be supported at any height, according to their length, and when required to be lowered it can be done simply by sawing them off shorter. The lower edges of these cross pieces, as well as those at the top, marked I, are tongued and grooved, as indicated at K L, Fig. 1, for facilitating the attachment of the combs to them by the bees. These sashes are made narrower than the case A, and supported between the bars N, which separate them from the sides, and thereby provide the air-spaces O for ventilating the hive. A similar space is provided at one end by the cross-bars P, and at the other end a wide space, Q, is provided, by means of the wedges, between which and the said pieces P the sash and end boards R are clamped by the wedges S. Said end boards have ventilating-holes T, covered by wire-gauze or other reticulated substance. The entrance to the space within the sash is between the lower cross pieces U, which are made narrower than the side pieces for the purpose. Above this set of sashes, within a cap, V, forming the top of the hive, I arrange another smaller set of beveled sashes for the depositing of the clear honey, confining them between the side boards W by bars N', and between the end boards $R^1$ by the wedges S' and the boards $R^2$, and placing them, together with a slide, X, on a board, Y, resting on the top bars H' of the lower sashes, having holes Z for the bees to pass upward through to the space within the upper sashes, said holes being arranged over passages $Z^1$ between some of the lower sashes. The slide X has holes $Z^2$, corresponding to holes Z, for completing the passage to the upper sash when the bees are to be admitted thereto, but said passages are cut off when the slide is moved in one direction. A passage, $a$, is made through the boards of one end of the upper set of sashes to the wide space A', and a passage, $b$, is made through the outer wall of the case or hive, coinciding with passage $a$, which are to be used for allowing the bees to escape from the upper sashes through a tube, $d$, to be properly inserted, as shown, when it is desired to remove any of the honey in the upper set of sashes, and for which the said sashes and the slide X are moved over the passages Z to close them, for preventing the bees below from coming up; then those remaining in the upper sashes may escape as stated. This passage may also be used for transferring the bees, the lower passages D being closed so that they cannot escape that way, and the tube being extended to another hive. The said passage $b$ is provided with a perforated cover, arranged to swing over it when it is not required to be open. The passage is plugged up when the tube is removed and the regular operations of the bees are going on.

Having thus described my invention, I claim as new and desire to secure by Letters Patent—

The arrangement of boards W $R^1$ $R^2$ Y, passages $a$ $b$, tube $d$, wedges S, bar $N'$, and slide X, as and for the purpose specified.

EDWARD D. PUGH.

Witnesses:
ROBERT CORNER,
WINFIELD S. WILLIS.